US012275852B2

(12) United States Patent
Seydel et al.

(10) Patent No.: US 12,275,852 B2
(45) Date of Patent: Apr. 15, 2025

(54) HIGH CHROMA FLAKES

(71) Applicant: VIAVI SOLUTIONS INC., San Jose, CA (US)

(72) Inventors: Johannes Seydel, Petaluma, CA (US); Mark Tevis, Novato, CA (US); Kangning Liang, Santa Rosa, CA (US); Jeffrey James Kuna, San Francisco, CA (US); Jaroslaw Zieba, Santa Rosa, CA (US); Paul Thomas Kohlmann, Windsor, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/538,684

(22) Filed: Nov. 30, 2021

(65) Prior Publication Data
US 2022/0089878 A1 Mar. 24, 2022

Related U.S. Application Data

(62) Division of application No. 15/633,619, filed on Jun. 26, 2017, now Pat. No. 11,214,689.
(Continued)

(51) Int. Cl.
*C09C 1/00* (2006.01)
*B32B 7/02* (2019.01)
(Continued)

(52) U.S. Cl.
CPC .............. *C09C 1/0015* (2013.01); *B32B 7/02* (2013.01); *B32B 7/023* (2019.01); *C09C 1/003* (2013.01);
(Continued)

(58) Field of Classification Search
CPC ...... C09C 1/0015; C09C 1/0024–0075; C09C 1/003; C09C 1/0033; C09C 1/0036;
(Continued)

(56) References Cited

U.S. PATENT DOCUMENTS 2,688,007 A 8/1954 Steinman
3,425,975 A 2/1969 James
(Continued)

FOREIGN PATENT DOCUMENTS

CN 1286761 A 3/2001
CN 1423212 A 6/2003
(Continued)

OTHER PUBLICATIONS

Translation of CN 101265681 by Shimizu et al. (Year: 2008).*
(Continued)

*Primary Examiner* — Christina H. W. Rosebach
(74) *Attorney, Agent, or Firm* — Mannava & Kang, P.C.

(57) ABSTRACT

An article including a reflector having a first surface and a second surface opposite the first surface; a first selective light modulator layer external to the first surface of the reflector; a second selective light modulator layer external to the second surface of the reflector; a first absorber layer external to the first selective light modulator layer; and a second absorber layer external to the second selective light modulator layer; wherein each of the first and second selective light modulator layers include a host material is disclosed herein. Methods of making the article are also disclosed.

16 Claims, 1 Drawing Sheet

Related U.S. Application Data

(60) Provisional application No. 62/355,147, filed on Jun. 27, 2016.

(51) Int. Cl.
  *B32B 7/023* (2019.01)
  *G02B 5/08* (2006.01)
  *G02B 5/26* (2006.01)
  *G02B 5/28* (2006.01)

(52) U.S. Cl.
  CPC .......... *C09C 1/0033* (2013.01); *C09C 1/0036* (2013.01); *C09C 1/0039* (2013.01); *C09C 1/006* (2013.01); *C09C 1/0063* (2013.01); *C09C 1/0066* (2013.01); *C09C 1/0069* (2013.01); *G02B 5/0808* (2013.01); *B32B 2250/05* (2013.01); *B32B 2250/40* (2013.01); *C01P 2006/62* (2013.01); *C01P 2006/65* (2013.01); *C01P 2006/66* (2013.01); *C09C 2200/1054* (2013.01); *C09C 2200/24* (2013.01); *C09C 2200/30* (2013.01); *C09C 2200/301* (2013.01); *C09C 2200/302* (2013.01); *C09C 2200/303* (2013.01); *C09C 2200/306* (2013.01); *C09C 2200/50* (2013.01); *C09C 2200/505* (2013.01); *C09C 2200/507* (2013.01); *C09C 2220/20* (2013.01); *G02B 5/26* (2013.01); *G02B 5/28* (2013.01)

(58) Field of Classification Search
  CPC ..... C09C 1/0039; C09C 1/006; C09C 1/0063; C09C 1/0066; C09C 1/0069; B32B 7/02; B32B 7/023; B32B 2250/05; B32B 2250/40; G02B 5/0808
  See application file for complete search history.

(56) References Cited

U.S. PATENT DOCUMENTS

| | | |
|---|---|---|
| 3,997,485 A | 12/1976 | Dowbenko et al. |
| 4,017,326 A | 4/1977 | Davis |
| 4,071,489 A | 1/1978 | Emmons et al. |
| 4,100,133 A | 7/1978 | Emmons et al. |
| 4,129,537 A | 12/1978 | Dhein et al. |
| 4,216,252 A | 8/1980 | Moeller |
| 4,332,861 A | 6/1982 | Franz et al. |
| 4,639,069 A | 1/1987 | Yatabe et al. |
| 5,055,345 A | 10/1991 | Wank et al. |
| 5,102,925 A | 4/1992 | Suzuki et al. |
| 5,135,812 A | 8/1992 | Phillips et al. |
| 5,136,404 A | 8/1992 | Nobile et al. |
| 5,219,900 A | 6/1993 | Davies et al. |
| 5,346,569 A * | 9/1994 | Simon ............... B32B 17/10688 |
| | | 156/286 |
| 5,471,331 A | 11/1995 | Takizawa et al. |
| 5,569,535 A | 10/1996 | Phillips et al. |
| 5,582,645 A | 12/1996 | Trest et al. |
| 5,641,544 A | 6/1997 | Melancon et al. |
| 5,700,607 A | 12/1997 | Rath |
| 5,743,981 A | 4/1998 | Lu |
| 5,877,895 A | 3/1999 | Shaw et al. |
| 6,132,504 A | 10/2000 | Kuntz et al. |
| 6,139,613 A * | 10/2000 | Hendrickson ......... C09C 1/0051 |
| | | 427/419.7 |
| 6,150,022 A | 11/2000 | Coulter et al. |
| 6,156,115 A | 12/2000 | Pfaff et al. |
| 6,235,105 B1 | 5/2001 | Hubbard et al. |
| 6,236,510 B1 * | 5/2001 | Bradley, Jr. .......... C09C 1/0015 |
| | | 359/585 |
| 6,243,204 B1 | 6/2001 | Bradley, Jr. et al. |
| 6,299,979 B1 | 10/2001 | Neubauer et al. |
| 6,376,018 B1 | 4/2002 | Kittler, Jr. |
| 6,383,638 B1 * | 5/2002 | Coulter ............... C09C 1/0024 |
| | | 106/419 |
| 6,531,221 B1 | 3/2003 | Schumacher |
| 6,572,784 B1 | 6/2003 | Coombs et al. |
| 6,686,042 B1 | 2/2004 | LeGallee |
| 6,749,936 B2 | 6/2004 | Argoitia et al. |
| 6,783,349 B2 | 8/2004 | Neavin et al. |
| 6,808,806 B2 | 10/2004 | Phillips et al. |
| 6,818,299 B2 | 11/2004 | Phillips et al. |
| 6,841,238 B2 | 1/2005 | Argoitia et al. |
| 6,894,086 B2 * | 5/2005 | Munro ................ C09D 5/004 |
| | | 523/105 |
| 6,913,783 B2 | 7/2005 | Lazarev et al. |
| 6,979,704 B1 | 12/2005 | Mayer et al. |
| 6,997,981 B1 | 2/2006 | Coombs et al. |
| 7,258,900 B2 | 8/2007 | Raksha et al. |
| 7,261,950 B2 | 8/2007 | Fleming et al. |
| 7,390,715 B2 | 6/2008 | Ou et al. |
| 7,455,904 B2 | 11/2008 | O'Keefe |
| 7,518,284 B2 | 4/2009 | Benslimane et al. |
| 7,625,596 B2 | 12/2009 | Lewis et al. |
| 7,629,051 B2 | 12/2009 | Fukushige et al. |
| 7,719,187 B2 | 5/2010 | Ray |
| 7,767,123 B2 | 8/2010 | Argoitia |
| 7,850,359 B2 | 12/2010 | Jeng et al. |
| 7,951,418 B2 | 5/2011 | O'Keefe |
| 8,252,412 B2 | 8/2012 | Purdy et al. |
| 8,372,685 B2 | 2/2013 | Robinson et al. |
| 8,454,859 B2 | 6/2013 | Lowenthal |
| 8,557,332 B2 | 10/2013 | Watanabe et al. |
| 8,586,457 B1 | 11/2013 | Liang et al. |
| 8,591,775 B2 | 11/2013 | Fujdala et al. |
| 8,641,933 B2 | 2/2014 | Purdy et al. |
| 8,715,537 B2 | 5/2014 | Fujdala et al. |
| 8,815,337 B2 | 8/2014 | Yializis et al. |
| 8,852,476 B2 | 10/2014 | Decker |
| 9,012,261 B2 | 4/2015 | Van Duren et al. |
| 9,105,526 B2 | 8/2015 | Le et al. |
| 9,105,527 B2 | 8/2015 | Van Duren et al. |
| 9,212,089 B2 | 12/2015 | Arsten et al. |
| 9,822,275 B2 | 11/2017 | Hibben |
| 10,048,415 B2 | 8/2018 | Banerjee et al. |
| 2002/0015914 A1 | 2/2002 | Miyamoto et al. |
| 2002/0137819 A1 | 9/2002 | Polonka |
| 2002/0160194 A1 | 10/2002 | Phillips et al. |
| 2002/0182383 A1 | 12/2002 | Phillips et al. |
| 2003/0203222 A1 | 10/2003 | Phillips et al. |
| 2003/0215641 A1 | 11/2003 | Phillips et al. |
| 2004/0001973 A1 | 1/2004 | Gao et al. |
| 2004/0012838 A1 | 1/2004 | Huibers et al. |
| 2004/0160672 A1 | 8/2004 | Phillips et al. |
| 2004/0166308 A1 | 8/2004 | Raksha et al. |
| 2005/0150740 A1 | 7/2005 | Finkenzeller et al. |
| 2005/0196584 A1 | 9/2005 | Halecki et al. |
| 2005/0261389 A1 | 11/2005 | Bratolavsky et al. |
| 2005/0261406 A1 | 11/2005 | Nakayama et al. |
| 2005/0267230 A1 | 12/2005 | Esaki et al. |
| 2006/0023327 A1 | 2/2006 | Coombs et al. |
| 2006/0068115 A1 | 3/2006 | Ogawa |
| 2006/0094323 A1 | 5/2006 | Hong et al. |
| 2006/0103781 A1 | 5/2006 | Jeng et al. |
| 2006/0263539 A1 | 11/2006 | Argoitia |
| 2006/0285184 A1 * | 12/2006 | Phillips ............... G02B 5/287 |
| | | 359/2 |
| 2007/0062445 A1 | 3/2007 | Kodou et al. |
| 2007/0070494 A1 | 3/2007 | Brott et al. |
| 2007/0230191 A1 | 10/2007 | Komuro et al. |
| 2007/0231571 A1 | 10/2007 | Lane et al. |
| 2008/0129928 A1 | 6/2008 | Jeng |
| 2008/0170192 A1 | 7/2008 | Jeng |
| 2009/0004478 A1 | 1/2009 | Baetzold et al. |
| 2009/0081460 A1 | 3/2009 | Argoitia et al. |
| 2009/0322993 A1 | 12/2009 | Saito et al. |
| 2010/0055401 A1 | 3/2010 | Choi et al. |
| 2010/0095868 A1 | 4/2010 | Kaupp et al. |
| 2010/0140916 A1 | 6/2010 | Firth |
| 2010/0261017 A1 | 10/2010 | Kikuchi |
| 2011/0013260 A1 | 1/2011 | Ohno |
| 2011/0042649 A1 | 2/2011 | Duvall et al. |

(56) References Cited

U.S. PATENT DOCUMENTS

| | | |
|---|---|---|
| 2011/0299167 A1 | 12/2011 | Woolf |
| 2012/0028009 A1 | 2/2012 | Gerardin et al. |
| 2012/0108700 A1 | 5/2012 | Kanzaki et al. |
| 2012/0177844 A1 | 7/2012 | Biver et al. |
| 2013/0095333 A1 | 4/2013 | Pal et al. |
| 2013/0164529 A1 | 6/2013 | Yu et al. |
| 2013/0233739 A1 | 9/2013 | Zhao et al. |
| 2013/0280854 A1 | 10/2013 | Jasieniak et al. |
| 2014/0035995 A1 | 2/2014 | Chou |
| 2014/0037890 A1 | 2/2014 | McJunkins |
| 2014/0050768 A1 | 2/2014 | Struck et al. |
| 2014/0110813 A1 | 4/2014 | Liang et al. |
| 2014/0151607 A1 | 6/2014 | Lowenthal |
| 2014/0238833 A1 | 8/2014 | Virkar et al. |
| 2014/0322452 A1 | 10/2014 | Kasyanova et al. |
| 2014/0322549 A1 | 10/2014 | Xu et al. |
| 2015/0055033 A1 | 2/2015 | Imamura et al. |
| 2015/0099119 A1 | 4/2015 | Farrand et al. |
| 2015/0118408 A1 | 4/2015 | Hong et al. |
| 2015/0123049 A1 | 5/2015 | Farrand et al. |
| 2015/0126680 A1 | 5/2015 | Farrand et al. |
| 2015/0129817 A1 | 5/2015 | Farrand et al. |
| 2015/0129818 A1 | 5/2015 | Blackman et al. |
| 2015/0129819 A1 | 5/2015 | Farrand et al. |
| 2015/0168746 A1 | 6/2015 | Blackman et al. |
| 2015/0184031 A1 | 7/2015 | Yurt et al. |
| 2015/0220057 A1 | 8/2015 | Tziovaras et al. |
| 2015/0235745 A1 | 8/2015 | Choe |
| 2015/0309353 A1 | 10/2015 | Stensvad et al. |
| 2015/0316686 A1 | 11/2015 | Vanier et al. |
| 2016/0076242 A1 | 3/2016 | Becker IV et al. |
| 2016/0085944 A1 | 3/2016 | Brophy et al. |
| 2016/0088756 A1 | 3/2016 | Ramadas |
| 2016/0168177 A1 | 6/2016 | Cunningham et al. |
| 2016/0264810 A1 | 9/2016 | Okamoto et al. |
| 2016/0326374 A1 | 11/2016 | Kuna et al. |
| 2016/0333526 A1 | 11/2016 | MacPherson et al. |
| 2017/0291401 A1 | 10/2017 | Yamane et al. |
| 2017/0368798 A1 | 12/2017 | Seydel et al. |
| 2017/0368866 A1 | 12/2017 | Seydel et al. |
| 2017/0371091 A1 | 12/2017 | Seydel et al. |
| 2020/0032111 A1 | 1/2020 | Ogawa |
| 2021/0141144 A1 | 5/2021 | Seydel et al. |

FOREIGN PATENT DOCUMENTS

| | | |
|---|---|---|
| CN | 1485146 | 3/2004 |
| CN | 1748874 | 3/2006 |
| CN | 1825140 A | 8/2006 |
| CN | 1946818 | 4/2007 |
| CN | 101210975 A | 7/2008 |
| CN | 100592980 C | 3/2010 |
| CN | 101680975 A | 3/2010 |
| CN | 101970587 A | 2/2011 |
| CN | 102077060 A | 5/2011 |
| CN | 102221722 A | 10/2011 |
| CN | 102481723 A | 5/2012 |
| CN | 102483567 | 5/2012 |
| CN | 101897036 B | 8/2012 |
| CN | 103415352 | 11/2013 |
| CN | 103608183 A | 2/2014 |
| CN | 103998955 | 8/2014 |
| CN | 104884265 A | 9/2015 |
| CN | 105283602 | 1/2016 |
| CN | 106032407 | 10/2016 |
| DE | 10349000 | 5/2005 |
| DE | 102005017169 | 10/2006 |
| DE | 102013021180 | 6/2015 |
| DE | 102014001688 | 8/2015 |
| EP | 0033896 | 8/1981 |
| EP | 1239307 | 9/2002 |
| EP | 1918334 | 5/2008 |
| EP | 2538247 | 12/2012 |
| JP | S5227892 Y2 | 6/1977 |
| JP | S55160060 | 12/1980 |
| JP | S5926251 | 2/1984 |
| JP | S60184001 U | 12/1985 |
| JP | S6221041 U | 2/1987 |
| JP | H0136891 Y2 | 11/1989 |
| JP | 02072700 | 3/1990 |
| JP | H09113927 | 5/1997 |
| JP | H10202153 | 8/1998 |
| JP | 2003335880 | 11/2003 |
| JP | 2006176742 | 7/2006 |
| JP | 2007011309 | 1/2007 |
| JP | 2007232958 | 9/2007 |
| JP | 2008088317 | 4/2008 |
| JP | 2008532069 | 8/2008 |
| JP | 2009520844 | 5/2009 |
| JP | 2011221376 | 11/2011 |
| JP | 2012097135 | 5/2012 |
| JP | 2012177938 | 9/2012 |
| JP | 20123050524 | 3/2013 |
| JP | 2013242396 | 12/2013 |
| JP | 2016072422 | 5/2016 |
| KR | 1020060011158 | 2/2006 |
| KR | 10-20080060707 | 7/2008 |
| KR | 1020090025217 | 3/2009 |
| KR | 20100081163 | 7/2010 |
| WO | 1990010246 | 9/1990 |
| WO | 00/31571 | 6/2000 |
| WO | 2003077019 | 9/2003 |
| WO | 2004016441 | 2/2004 |
| WO | 2004/072186 | 8/2004 |
| WO | 2006007742 | 1/2006 |
| WO | 2008061930 | 5/2008 |
| WO | 2012078820 | 6/2012 |
| WO | 2013079542 | 6/2013 |
| WO | 2014085473 | 6/2014 |
| WO | 2014/410427 | 9/2014 |
| WO | 2016060173 | 4/2016 |
| WO | 2016076333 | 5/2016 |

OTHER PUBLICATIONS

Arceneaux, et al., "Mitigation of Oxygen Inhibition in UV LED, UVA, and Low Intensity UV Cure", RadTech 2014, 11 pages.

Daniel R. Swiler, "Pigments, Inorganic", Kirk-Othmer Encyclopedia of Chemical Technology, Published online on Aug. 19, 2005, 38 pages.

Quantum Dots, Sigma-Aldrich (RTM), retrieved from "https://www.sigmaaldrich.com/technical-documents/articles/materials-science/nanomaterials/quantum-dots.html" on Mar. 12, 2020. (Year: 2020).

Quantum dot, Wikipedia (RTM), Retrieved from "https://en.wikipedia.org/w/index.php?title=Quantum_dot&oldid=942721 024" on Mar. 12, 2020. (Year: 2020).

Modaflow (RTM) Resin, Technical Datasheet, Version 5.0, Allnex, Jun. 18, 2020, 2 pages. (Year: 2020).

BYK-361 N, Technical Data Sheet, BYK (RTM) Additives & Instruments, Dec. 2012, 4 pages. (Year: 2012).

Paint Additives, Product Guide L-G 1, BYK (RTM) Additives & Instruments, Feb. 2009, 15 pages. (Year: 2009).

BYK-306, Technical Data Sheet, BYK (RTM) Additives & Instruments, Nov. 2012, 2 pages. (Year: 2012).

Penzel, E. "Polyacrylates", In Ullmann's Encyclopedia of Industrial Chemistry, year 2000, vol. 28, pp. 515-536.

BASF brochure entitled "High lights! Radiation curing with resins and photoinitiators for industrial coatings and graphic arts: Laromer®, Irgacure®, Lucirin®, Darocur®", BASF the Chemical Company, Aug. 6, 2014, 44 pages.

Husar, et al., "The formulator's guide to anti-oxygen inhibition additives", Progress in Organic Coatings 77, 2014, p. 1789-1798, 10 pages.

Cohen et al., "Modern Coating and Drying Technology", John Wiley & Sons, Inc., Oct. 1999, 6 pages.

"Office Action, China Application No. 202011447471.9", dated Sep. 30, 2022, 9 pages including portion English translation cited as the concise statement of relevance regarding NPL reference Cohen.

Kobayashi, Satosi, Toyo Aluminium K.K. Product Report, Colored Aluminium Paste, Fall 2012. (Year: 2012).

(56) References Cited

OTHER PUBLICATIONS

"200 Questions on UV Optical Technology", Gao Jing, p. 33, Printing Industry Press, Jan. 2012, 17 pages (relevant p. 33).

"Acid-catalyzed synthesis of butane-1, 2-propanediol condensation agent using phosphorus supported on silica", Yang Shui-Jin et al., Chemical Intermediate, No. 11, Nov. 15, 2012, 3 pages.

"New Technology of Modern Coating Technology", Liu Guojie, (relevant p. 231), China Light Industry Press, Apr. 2000, 32 pages.

"Study on influences of oxygen for photochemical solidification adhesive solidification", Wang Zhengping, Chemical Engineer, vol. 107, No. 8, Aug. 30, 2004, 10 pages.

Du Zhenxia et al., "Research on surface modification of nano-calcium carbonate and its application in coatings". Journal of Beijing University of Chemical Technology, vol. 26, No. 2, Jun. 30, 1999, 8 pages.

Hubei Paper, No. 4, "Study on the Effect of Nanoscale Calcium Carbonate on the Properties of Coatings and Papers", Zhang Heng et al., Dec. 30, 2003, 9 pages.

IM&P, "Chemical Minerals and Processing", No. 5, May 25, 2003, 4 pages.

Li Huachun et al., "The inhibitory effect of oxygen in the photocuring process of coatings", Modern Plastics Processing and Application, vol. 14, No. 4, Aug. 15, 2002, 12 pages.

Liu Guojie et al., "Some new developments in research and development of acrylic resins and coatings", Monographs and Reviews, vol. 15, No. 8, Aug. 20, 2012, 18 pages.

Liu Junhua, et al., "Synthesis of multifunctional acrylated pilyester and its photocuring", Thermosetting Resin, vol. 18, No. 1, Jan. 30, 2003, 13 pages.

Polymer Bulletin, No. 9, Sun Jiazhen, et al., Aug. 28, 2015, 37 pages.

Progress in Chemistry, vol. 23, No. 11, Chen Bingkun et al., Nov. 24, 2011, 33 pages.

* cited by examiner

HIGH CHROMA FLAKES

RELATED APPLICATION

The present application claims the benefit of priority to U.S. patent application Ser. No. 15/633,619, filed Jun. 26, 2017, allowed; which claims priority to U.S. Provisional Application No. 62/355,147, filed on Jun. 27, 2016, the entire disclosures of which are hereby incorporated by reference.

FIELD OF THE INVENTION

The present disclosure generally relates to articles, such as optical devices in the form of foil, sheets, and/or flakes that can be used as pigments. The pigments can (i) include a strong color, and (ii) have a high flop, i.e., be specular and have a metallic appearance that can vary from bright to dark as an angle varies. Methods of making the articles are also disclosed.

BACKGROUND OF THE INVENTION

Articles, such as flakes, can be used to as a security feature of currency and consumer applications with enhanced optical properties. Unfortunately, present manufacturing methods, such as vapor deposition processes, require expensive and complex equipment to make the flakes. Cheaper methods that presently exist provide poor quality pigments for use as security features. Additionally, the deposition of polymer thin films by evaporation results in poor interlayer adhesion. Further, working in a vacuum negatively impacts the productivity of this equipment over time. Moreover, there is extensive non-productive time related to maintenance of this equipment, which requires pumping and venting the chambers. Furthermore, the type of materials available for use in making flakes or foils is limited to only those that can be vaporized under low pressure, thereby eliminating most organic materials.

SUMMARY OF THE INVENTION

In an aspect, there is disclosed an article that can include a reflector having a first surface and a second surface opposite the first surface; a first selective light modulator layer external to the first surface of the reflector; a second selective light modulator layer external to the second surface of the reflector; a first absorber layer external to the first selective light modulator layer; and a second absorber layer external to the second selective light modulator layer; wherein each of the first and second selective light modulator layers include a host material.

In a further aspect, there is disclosed a method for manufacturing an article comprising depositing on a substrate a first absorber layer; depositing on the first absorber layer a first selective light modulator layer; depositing on the first selective light modulator layer a reflector; depositing on the reflector a second selective light modulator layer; and depositing on the second selective light modulator layer a second absorber layer; wherein at least one of the first selective light modulator layer and the second selective light modulator layer is deposited using a liquid coating process.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein are articles, such as optical devices in the form of flakes, sheets, and foils; and a method of manufacturing the articles.

Figure 1:
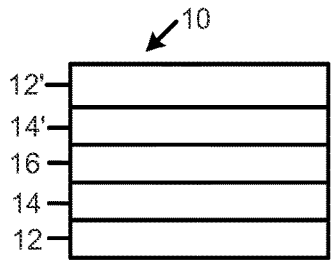
FIG. 1 is a cross-sectional view of an article, such as in the form of a flake, according to an example of the present disclosure.

In an aspect, as shown in FIG. 1, the article 10 can include a reflector 16 having a first surface and a second surface opposite the first surface; a first selective light modulator layer (SLML) 14 external to the first surface of the reflector 16; a second selective light modulator layer 14' external to the second surface of the reflector 16; a first absorber 12 external to the first selective light modulator layer 14; and a second absorber layer 12' external to the second selective light modulator layer 14'; wherein each of the first and second selective light modulator layers 14, 14' include a host material.

In some examples, the article 10 can exhibit optical interference. Alternatively, in some examples, the article 10 can not exhibit optical interference. In an aspect, the article 10 can exploit interference to generate color. In another aspect, the articles can not exploit interference to generate color. For example, as described in further detail below, the appearance of color can be generated by including a selective light modulator system (SLMS), such as an additive, a selective light modulator particle (SLMP) or a selective light modulator molecule (SLMM) in the SLML.

Figure 2:
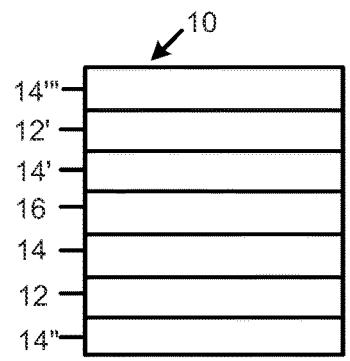
FIG. 2 is a cross-sectional view of an alternative article, such as in the form of a flake, according to another example of the present disclosure.
Figure 3:
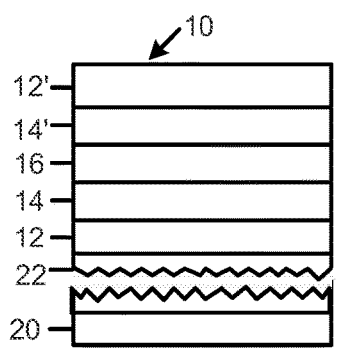
FIG. 3 is a cross-sectional view of an article prior to being released from a substrate, according to an example of the present disclosure.

FIGS. 1-3 illustrate various articles, such as in the form of a flake, foil, or sheet, according to various examples of the present disclosure. Although, these Figures illustrate specific layers in specific orders, one of ordinary skill in the art would appreciate that the article 10 can include any number of layers in any order.

In an aspect, as shown in FIG. 1, the article 10 can be in a form of a foil or flake that can be used on an object or a substrate (not shown), can be combined with a liquid medium to form a color shifting colorant, or can be used as a pigment. A flake can have, for example, 100 nm to 100 μm in thickness and 100 nm to 1 mm in size. Some attributes common to use of the article 10, such as in the form of a flake, can include high chromaticity (or strong color), color change with respect to viewing angle (also known as goniochromaticity or iridescence), and flop (a specular and metallic appearance that varies in lightness, hue, or chromaticity as the viewing angle varies). Additionally, the article 10, such as in the form of a flake, can exhibit color shifting properties with changes in angle of incident light or with viewing angle The color shifting properties of the article 10 can be controlled through proper design of the article, such as in the form of a flake. Desired effects can be achieved through the variation of parameters such as thickness of the layers forming the flakes and the index of refraction of each layer. The changes in perceived color which occur for different viewing angles or angles of incident light are a result of a combination of selective absorption of the materials comprising the layers and wavelength dependent interference effects. The absorption characteristics of a material are responsible for the basic color which is observed. The interference effects, which arise from the superposition of the light waves that have undergone multiple reflections and transmissions within the multilayered thin film structure, are responsible for the shifts in perceived color with different angles.

The article 10 can comprise first and second selective light modulator layers 14", 14'''. In an aspect as shown in FIG. 2, the article 10 can comprise four selective light modulator layers 14, 14', 14", 14''', two of the four selective light modulator layers 14, 14' can be external to the first and second surfaces of the reflector 16. The remaining two of the four selective light modulator layers 14", 14''' can be external to the first and second absorber layers 12, 12', respectively.

Although, FIGS. 1 and 2 illustrate specific layers in specific orders, one of ordinary skill in the art would appreciate that the article 10 can include any number of layers in any order. Additionally, the composition of any particular layer can be the same or different from the composition of any other layer. If more than one SLML 14, 14' is present in an article 10, each SLML can be independent in terms of their respective compositions and physical properties. For example, a first SLML 14 can have a composition with a first refractive index, but a second SLML 14' in the same article can have a different composition with a different refractive index. As another example, a first SLML 14 can have a composition at a first thickness, but the second SLML 14' can have the same composition at a second thickness different from the first thickness. Additionally or alternatively, the article 10 in the form of a flake, sheet, or foil can also include a hard coat or protective layer on the surfaces of SLML 14 and/or SLML 14'. In some examples, these layers (hard coat or protective layer) do not require have optical qualities.

As shown in FIGS. 1-3, at least two surfaces/sides of the reflector 16, for example, the right and left surface/side as shown, and/or at least two surfaces/sides of each of the first and second absorber layers 12, 12' can be free of SLMLs 14, 14'. In an aspect, if the article 10 is in the form of a flake or foil, then reflector 16 can include more than the four surfaces exemplified in FIGS. 1-3. In those instances, for example, one, two, three, four, or five surfaces of reflector 16 can be free of SLMLs 14. In some examples, one, two, three, four, or five surfaces of reflector 16, and therefore article 10, can be open to the air. In an example, open sides, i.e., surfaces of the reflector 16 that do not contain an external SLML, can be an advantage for flop.

For each example shown in FIGS. 1-3, reflector 16 can be a wideband reflector, e.g., spectral and Lambertian reflector (e.g., white $TiO_2$). The terms "metallic" or "metallic layer" used herein, unless otherwise stated, are intended to include all metals, metal alloys, pure metal or metal alloy containing materials, compound, compositions, and/or layers. The materials for the reflector 16 can include metals, non-metals, and/or metal alloys. In one example, the materials for the reflector 16 can include any materials that have reflective characteristics in the desired spectral range. For example, any material with a reflectance ranging from 5% to 100% in the desired spectral range. An example of a reflective material can be aluminum, which has good reflectance characteristics, is inexpensive, and easy to form into or deposit as a thin layer. However, other reflective materials can also be used in place of aluminum. For example, copper, silver, gold, platinum, palladium, nickel, cobalt, niobium, chromium, tin, and combinations or alloys of these or other metals can be used as reflective materials. In an aspect, the material for the reflector 16 can be a white or light colored metal. Other useful reflective materials include, but are not limited to, the transition and lanthanide metals and combinations thereof; as well as metal carbides, metal oxides, metal nitrides, metal sulfides, a combination thereof, or mixtures of metals and one or more of these materials.

The thickness of reflector 16 can range from about 50 nm to about 5000 nm, although this range should not be taken as restrictive. For example, the lower thickness can be selected so that reflector 16 provides a maximum transmittance of 0.8. Additionally or alternatively, for a reflector 16 including aluminum the minimum optical density (OD) can be from about 0.1 to about 4 at a wavelength of about 550 nm.

In order to obtain a sufficient optical density and/or achieve a desired effect, a higher or lower minimum thicknesses can be required depending of the composition of reflector 16. In some examples, the upper limit can be about 5000 nm, about 4000 nm, about 3000 nm, about 1500 nm, about 200 nm, and/or about 100 nm. In one aspect, the thickness of the reflector 16 can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

The article 10, for example, in the form of a flake, sheet, or foil, of FIGS. 1-3 can include a first selective light modulator layer (SLML) 14 and a second selective light modulator layer 14'. The SLML can be a physical layer comprising a plurality of optical functions aiming at modulating (absorbing and or emitting) light intensity in different, selected regions of spectrum of electromagnetic radiation with wavelengths ranging from about 0.2 μm to about 20 μm.

SLMLs 14, 14', 14", and 14''' (and/or the materials within the SLMLs 14, 14') can each selectively modulate light. For example, an SLML can control the amount of transmission in specific wavelengths. In some examples, the SLML can selectively absorb specific wavelengths of energy (e.g., in the visible and/or non-visible ranges). For example, the SLML 14, 14', 14", and 14''' can be a "colored layer" and/or a "wavelength selective absorbing layer." In some examples, the specific wavelengths absorbed can cause the article 10, for example, in the form of a flake, to appear a specific color. For example, the SLML 14, 14', 14", and 14''' can appear red to the human eye (e.g., the SLML can absorb wavelengths of light below approximately 620 nm and thus reflect or transmit wavelengths of energy that appear red). This can be accomplished by adding SLMPs that are colorants (e.g., organic and/or inorganic pigments and/or dyes) to a host material, such as a dielectric material, including but not limited to a polymer. For example, in some instances, the SLML can be a colored plastic.

In some examples, some or all of the specific wavelengths absorbed can be in the visible range (e.g., the SLML can be absorbing throughout the visible, but transparent in the infrared). The resulting article 10, for example in the form of a flake, would appear black, but reflect light in the infrared. In some examples described above, the wavelengths absorbed (and/or the specific visible color) of the article 10 and/or SLML 14, 14', 14", and 14''' can depend, at least in part, on the thickness of the SLML 14, 14', 14", and 14'''. Additionally or alternatively, the wavelengths of energy absorbed by the SLML 14, 14', 14", and 14''' (and/or the color in which these layers and/or the flake appears) can depend in part on the addition of certain aspects to the SLML 14, 14', 14", and 14'''. In addition to absorbing certain wavelengths of energy, the SLML 14, 14', 14", and 14''' can achieve at least one of bolstering the reflector 16 against degradation; enabling release from a substrate; enabling sizing; providing some resistance to environmental degradation, such as oxidation of aluminum or other metals and materials used in the reflector 16; and high performance in transmission, reflection, and absorption of light based upon the composition and thickness of the 14, 14', 14", and 14'''.

In some examples, in addition to or as an alternative to the SLMLs 14, 14', 14", and 14''' selectively absorbing specific wavelengths of energy and/or wavelengths of visible light, the SLMLs 14, 14', 14", and 14''' of the article 10, for example in the form of a sheet, can control the refractive index and/or the SLMLs 14, 14', 14", and 14''' can include SLMPs that can control refractive index. SLMPs that can control the refractive index of the SLML 14, 14', 14", and 14''' can be included with the host material in addition to or as an alternative to an absorption controlling SLMPs (e.g., colorants). In some examples, the host material can be combined with both absorption controlling SLMPs and refractive index SLMPs in the SLMLs 14, 14', 14", and 14'''. In some examples, the same SLMP can control both absorption and refractive index.

In each aspect, as shown, for example in FIGS. 1-2, the SLML 14, 14', 14", and 14''' can be a transparent layer or can be a colored layer.

The performance of the SLML 14, 14', 14", and 14''' can be determined based upon the selection of materials present in the SLML 14, 14', 14", and 14'''. It is believed that the SLML 14, 14', 14", and 14''' can achieve high performance in transmission, reflection, and absorption of light based upon the composition of each of the SLML 14, 14', 14", and 14'''. In an aspect, the SLML 14, 14', 14", and 14''' can include a composition that allows for a wider range of materials configured to increase the control of the optical performance of the SLML 14, 14', 14", and 14'''. In an aspect, the SLML 14, 14', 14", and 14''' can improve at least one of the following properties: flake handling, corrosion, alignment, and environmental performance of any other layers within article 10, e.g., the reflector 16 and/or first and second absorber 12, 12'.

The SLML 14, 14', 14", and 14''' can each independently comprise a host material alone, or a host material combined with a selective light modulator system (SLMS). In an aspect, at least one of the first SLML 14 and the second SLML 14' includes a host material. In another aspect, at least one of the first SLML 14 and the second SLML 14' includes a host material and a SLMS. In another aspect, the first SLML 14 includes a host material and the SLMS; and the second SLML 14' includes a host material. The SLMS can include a selective light modulator molecule (SLMM), a selective light modulator particle (SLMP), an additive, or combinations thereof. In an aspect, at least one of the first and second SLML 14, 14' further includes a SLMS. The SLMS in the first SLML 14 can be different from a SLMS in the second SLML 14'. In an aspect, the SLMS in the first SLML 14 can be the same as a SLMS in the second SLML 14'.

The composition of the SLML 14, 14', 14", and 14''' can have a solids content ranging from about 0.01% to about 100%, for example from about 0.05% to about 80%, and as a further example from about 1% to about 30%. In some aspects the solids content may be greater than 3%. In some aspects, the composition of the SLML 14, 14', 14", and 14''' can have a solids content ranging from about 3% to about 100%, for example from about 4% to 50%.

The host material of each of the SLMLs 14, 14', 14", and 14''' can independently be a film forming material applied as a coating liquid and serving optical and structural purposes. The host material can be used as a host (matrix) for introducing, if necessary, a guest system, such as the selective light modulator system (SLMS), for providing additional light modulator properties to the article 10.

The host material can be a dielectric material. Additionally or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

Each of the SLMLs 14, 14', 14", and 14''' can include from about 0.001% to about 100% by weight of a host material. In an aspect, the host material can be present in the SLML in an amount ranging from about 0.01% to about 95% by weight, for example from about 0.1% to about 90%, and as a further example from about 1% to about 87% by weight of the SLML. The host material in each of the SLML 14, 14', 14", and 14''' can each independently be different or the same. For example, the host material in the first SLML 14 can be different from the host material in the second SLML 14'. In another example, the host material in the first SLML 14 can be the same as the host material in the second SLML 14'.

The SLMS, for use in the SLMLs 14, 14', 14", and 14''' with the host material, can each independently comprise selective light modulator particles (SLMP), selective light modulator molecules (SLMM), additives, or a combination thereof. The SLMS can also comprise other materials. The SLMS can provide modulation the amplitude of electromagnetic radiation (by absorption, reflectance, fluorescence etc.) in a selective region or the entire spectral range of interest (0.2 μm to 20 μm).

The SLMLs 14, 14', 14", and 14''' can each independently include in an SLMS a SLMP. The SLMP can be any particle combined with the host material to selectively control light modulation, including, but not limited to color shifting particles, dyes, colorants includes colorant includes one or more of dyes, pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—SnO, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore.

In some aspects, SLMS of each of the SLMLs 14, 14', 14", and 14''' can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML 14, 14', 14", and 14''' in an amount ranging from about 25 ppm to about 5% by weight.

The SLMLs 14, 14', 14", and 14''' can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), sec-butyl methyl ketone (SBMK), ter-butyl methyl ketone (TBMK), cyclopenthanon, and anisole; glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the composition of the SLML 14, 14', 14", and 14''' in an amount ranging from about 0% to about 99.9%, for example from about 0.005% to about 99%, and as a further example from about 0.05% to about 90% by weight relative to the total weight of the composition the SLML 14, 14', 14", and 14'''.

In some examples, the first and second SLML 14, 14', 14", and 14''' can each independently include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical process. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML 14, 14', 14", and 14'''.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first, second, third, and/or fourth SLML 14, 14', 14", and 14''' in an amount ranging from about 5% to about 95%, for example from about 10% to about 90%, and as a further example from about 15% to about 85% by weight relative to the total weight of the composition of the SLML 14, 14', 14", and 14'''.

In some examples, the host material of the SLML 14, 14', 14", and 14''' can use a non-radical cure systems such as a cationic system. Cationic systems are less susceptible to the mitigation of the oxygen inhibition of the free radical process, and thus may not require an oxygen inhibition mitigation composition. In an example, the use of the monomer 3-Ethyl-3-hydroxymethyloxetane does not require an oxygen mitigation composition.

In an aspect, the composition of the SLML 14, 14', 14", and 14''' can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The composition can include only Type I photoinitiators, only Type II photoinitiators, or a combination of both Type I and Type II photoinitiators. The photoinitiator can be present in the composition of the SLML 14,14', 14", and 14''' in an amount ranging from about 0.25% to about 15%, for example from about 0.5% to about 10%, and as a further example from about 1% to about 5% by weight relative to the total weight of the composition of the SLML 14, 14', 14", and 14'''.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide, The bis acyl phosphine oxide can be a bis (2,4,6-trimethylbenzoyl)phenylphosphineoxide. In an aspect, at least one phosphineoxide can be present in the composition of the SLML 14, 14', 14", and 14'''. For example, two phosphineoxides can be present in the composition of the SLML 14, 14'.

A sensitizer can be present in the composition of the SLML 14, 14', 14", and 14''' and can act as a sensitizer for Type 1 and/or a Type II photoinitiators. The sensitizer can also act as a Type II photoinitiator. In an aspect, the sensitizer can be present in the composition of the SLML 14, 14', 14", and 14''' in an amount ranging from about 0.05% to about 10%, for example from about 0.1% to about 7%, and as a further example from about 1% to about 5% by weight relative to the total weight of the composition of the SLML 14, 14', 14", and 14'''. The sensitizer can be a thioxanthone, such as 1-chloro-4-propoxythioxanthone.

In an aspect, the SLML 14, 14', 14", and 14''' can include a leveling agent. The leveling agent can be a polyacrylate. The leveling agent can eliminate cratering of the composition of the SLML 14, 14', 14", and 14'''. The leveling agent can be present in the composition of the SLML 14, 14', 14", and 14''' in an amount ranging from about 0.05% to about 10%, for example from about 1% to about 7%, and as a further example from about 2% to about 5% by weight relative to the total weight of the composition of the SLML 14, 14', 14", and 14'''.

The SLML 14, 14', 14", and 14''' can also include a defoamer. The defoamer can reduce surface tension. The defoamer can be a silicone free liquid organic polymer. The defoamer can be present in the composition of the SLML 14, 14', 14", and 14''' in an amount ranging from about 0.05% to about 5%, for example from about 0.2% to about 4%, and as a further example from about 0.4% to about 3% by weight relative to the total weight of the composition of the SLML 14, 14', 14", and 14'''.

The SLML 14, 14', 14", and 14''' can each independently have a refractive index of greater or less than about 1.5. For example, each SLML 14, 14', 14", and 14''' can have a refractive index of approximately 1.5. The refractive index of each SLML 14, 14', 14", and 14''' can be selected to provide a degree of color travel required wherein color travel can be defined as the change in hue angle measured in L*a*b* color space with the viewing angle. In some examples, each SLMLs 14, 14', 14", and 14''' can include a refractive index in a range of from about 1.1 to about 3.0, about 1.0 to about 1.3, or about 1.1 to about 1.2. In some examples, the refractive index of each SLMLs 14, 14', 14", and 14''' can be less than about 1.5, less than about 1.3, or less than about 1.2. In some examples, 14, 14', 14", and 14''' can have substantially equal refractive indexes or different refractive indexes one from the other.

Each of these SLML 14, 14', 14", 14''' can include a refraction index in a range of from about 1.0 to about 3.0, for example greater than about 1.8, for example greater than about 2.0, and as a further example greater than about 2.5. It is believed that the use of a SLML 14, 14', 14", 14''' with a higher refractive index (>1.8) the interference conditions would be less sensitive to changes in angle. High index SLML 14, 14', 14", and 14''' can reduce the amount of color travel with angle. For example, in a flake as depicted in FIG. 2, it is expected that the additional SLML 14" and 14''' can reduce the amount of angle changing the reflecting light experiences in the cavity between the reflector 16 and the first and second absorber layers 12, 12'. The additional SLML 14" and 14''' can also serve as an extra cavity for interference even without additional absorber layers, such as third and fourth absorber layers, making the flake of FIG. 2 an effective two cavity design.

The SLML 14, 14', 14", and 14''' can each independently have a thickness ranging from 1 nm to about 10000 nm, about 10 nm to about 1000 nm, about 20 nm to about 500 nm, about 1 nm, to about 100 nm, about 10 nm to about 1000 nm, about 1 nm to about 5000 nm. In an aspect, the article 10, such as an optical device in the form of a flake, can have an aspect ratio of 1:1 to 1:50 thickness to width. In an example, a thickness of the first SLML 14 can be different from a thickness in the second SLML 14'. In another example, a thickness of the first SLML 14 can be the same as a thickness in the second SLML 14'.

One of the benefits of the articles 10 described herein, however, is that, in some examples, the optical effects appear relatively insensitive to thickness variations. Thus, in some aspects, each SLML 14, 14', 14''', and 14'''' can each independently have a variation in optical thickness of less than about 5%. In an aspect, each SLML 14, 14', 14", and 14''' can include an optical thickness variation of less than about 3% across the layer. In an aspect, each SLML 14, 14', 14", and 14''' can independently have less than about 1% variation in optical thickness across the layer having a thickness of 50 nm.

The first and second absorber layers 12, 12' can be disposed on its corresponding SLML 14, 14'. No matter what the configuration may be, the first and second absorber layers 12, 12' can each independently include metals or metal alloys. In one example, the materials for the first and second absorber layers 12, 12' can include any absorber material, including both selective absorbing materials and nonselective absorbing materials. For example, the first and second absorber layers 12, 12' can each independently be formed of nonselective absorbing metallic materials deposited to a thickness at which the absorber layer is at least partially absorbing, or semi-opaque. An example of a nonselective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials that may be used to form the first and second absorber layers 12, 12'.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the first and second absorber layers 12, 12' include, but are not limited to, titanium-based compounds such as titanium silicide (TiSi2), titanium boride (TiB2), and combinations thereof. Alternatively, the first and second absorber layers 12, 12' can each independently be composed of a titanium-based alloy disposed in a matrix of Ti, or can be composed of Ti disposed in a matrix of a titanium-based alloy. For example, as shown in FIGS. 1 and 2, the first and second absorber layer 12, 12' can include chromium.

The first and second absorber layer 12, 12' can also be independently formed of a magnetic material, such as a cobalt nickel alloy. This can simplify the manufacture of a magnetic color shifting device or structure by reducing the number of materials required.

The first and second absorber layer 12, 12' can be formed to have a physical thickness in the range from about 1 nm to about 50 nm, such as from about 5 nm to about 10 nm, depending upon the optical constants of the absorber layer material and the desired peak shift. The first and second absorber layer 12, 12' can each be composed of the same material or a different material, and can have the same or different physical thickness for each layer.

In an aspect, the article 10, such as an optical device in the form of a flake, foil or sheet, can also include a substrate 20 and a release layer 22 as shown in FIG. 3. In an aspect, the release layer 22 can be disposed between the substrate 20 and the first or second absorber layer 12, 12'.

The article 10, such as optical devices, described herein can be made in any way. For example, a flake (e.g., article 10 of FIGS. 1 and 2) can be made and then divided, broken, ground, etc. into smaller pieces forming an optical device. In some examples, the flake (e.g., article 10 of FIGS. 1 and 2) can be created by a liquid coating process, including, but not limited the processes described below and/or with respect to FIG. 4.

There is disclosed a method for manufacturing an article comprising depositing on a substrate a first absorber layer; depositing on the first absorber layer a first selective light modulator layer; depositing on the first selective light modulator layer a reflector; depositing on the reflector a first selective light modulator layer; and depositing on the first selective light modulator layer a second absorber layer; wherein at least one of the first selective light modulator layer and the second selective light modulator layer is deposited using a liquid coating process.

With respect to the aspect shown in FIGS. 1-3, in practice, to create article 10, a first absorber layer 12 can be deposited on the substrate 20. The substrate 20 can have a release layer 22. The substrate 20 can be made of a flexible material. The first absorber layer 12 can be deposited onto the substrate 20 by conventional deposition processes. Once the first absorber layer 12 has been deposited, the substrate 20 and the deposited first absorber layer 12 can be removed from the deposition apparatus. The substrate 20 and the deposited first absorber layer 12 can then be introduced to a liquid coating apparatus, such as a slot die apparatus, to deposit the first SLML 14 on the surface of the first absorber layer 12. Once the first SLML 14 has been deposited and cured, a reflector 16 can then be deposited on the first SLML 14 by conventional deposition processes. The above process is then repeated in a reverse order. For example, the second SLML 14' can be deposited on the surface of the reflector 16 using a liquid coating process. Once the second SLML 14' has been cured, the substrate 20 and all of the deposited layers can be transferred to a conventional deposition process apparatus to deposit the second absorber layer 12'.

In another aspect, the article 10 can be prepared by depositing on a substrate 20 a third SLML 14'', depositing on the third SLML 14'' a first absorber layer 12, depositing on the first absorber layer 12 a first SLML 14, depositing on the first SLML 14 a reflector 16, depositing on the reflector 16 a second SLML 14', depositing on the second SLML 14' a second absorber layer 12', and depositing on the second absorber layer 12' a fourth SLML 14''', wherein each of the first, second, third, and fourth SLML 14, 14', 14'', and 14''' are independently deposited using a liquid coating process. The liquid coating process includes, but is not limited to: slot-bead, slide bead, slot curtain, slide curtain, in single and multilayer coating, tensioned web slot, gravure, roll coating, and other liquid coating and printing processes that apply a liquid on to a substrate to form a liquid layer or film that is subsequently dried and/or cured to the final SLML layer.

In some examples, at least one of the reflector 16, the first absorber layer 12, or the second absorber layer 12' can each independently be applied to the respective layers by any known conventional deposition process, such as physical vapor deposition, chemical vapor deposition, thin-film deposition, atomic layer deposition, etc., including modified techniques such as plasma enhanced and fluidized bed.

The substrate 20 can be any suitable material that can receive the deposited layers. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate 20 can vary in thickness, but can range for example from about 2 μm to about 100 μm, and as a further example from about 10 to about 50 μm.

The substrate 20 can then be released from the deposited layers to create the article 10, for example in FIGS. 1 and 2. In an aspect, the substrate 20 can be cooled to embrittle the associated release layer. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be ground into article 10, such as an optical device in the form of a flake, foil, or sheet, using known techniques.

In another aspect, the deposited layers can be transferred from the substrate 20 to another surface. The deposited layers can be punched or cut to produce large flakes with well-defined sizes and shapes.

As stated above, the first, second, third, and fourth SLML 14, 14', 14'', and 14''' can be deposited by a liquid coating process, such as a slot die process. However, it was previously believed that liquid coating processes, such as a slot die process, could not operate stably at optical thicknesses, such as from about 50 to about 700 nm. In particular, very thin, wet films have commonly formed islands of thick areas where solids have been wicked away from the surrounding thin areas by capillary forces as solvents evaporate. This reticulated appearance is not compatible with optical coatings as the variable thickness can result in a wide range of optical path lengths, such as a wide range of colors resulting in a speckled/textured appearance, as well as reduced color uniformity of the optical coating and low chromaticity.

In an aspect of the present disclosure, the SLML 14, 14', 14'', and 14''' can be formed using a liquid coating process, such as a slot die process. In an aspect, the liquid coating process includes, but is not limited to: slot-bead, slide bead, slot curtain, slide curtain, in single and multilayer coating, tensioned web slot, gravure, roll coating, and other liquid coating and printing processes that apply a liquid on to a substrate to form a liquid layer or film that is subsequently dried and/or cured to the final SLML layer. The liquid coating process can allow for the transfer of the composition of the SLML 14, 14', 14'', and 14''' at a faster rate as compared to other deposition techniques, such as vapor deposition.

Additionally, the liquid coating process can allow for a wider variety of materials to be used in the SLML 14, 14', 14'', and 14''' with a simple equipment set up. It is believed that the SLML 14, 14', 14", and 14'" formed using the disclosed liquid coating process can exhibit improved optical performance.

Figure 4:
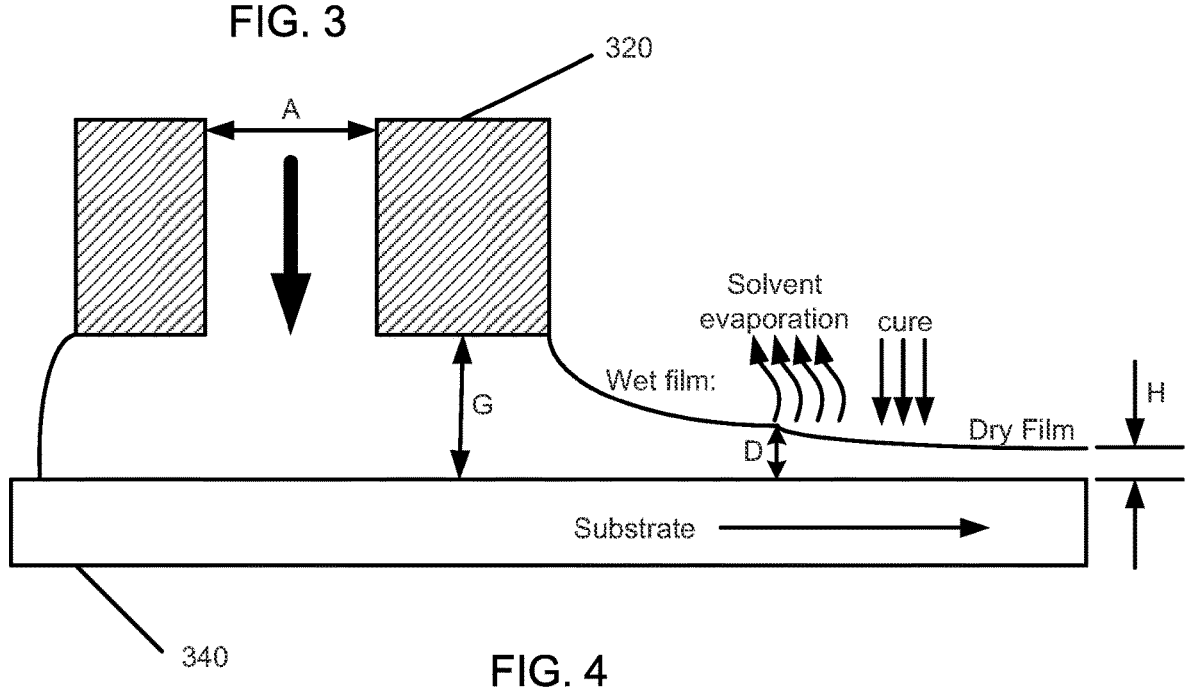
FIG. 4 is a cross sectional view of a liquid coating process showing the stages of depositing a selective light modulator layer, according to an example of the present disclosure.

FIG. 4 illustrates the formation of the SLML 14, 14', 14", and 14'" using a liquid coating process. The composition of the SLML (a liquid coating composition) can be inserted into a slot die 320 and deposited on a substrate 340 resulting in a wet film. With reference to the process disclosed above, the substrate 340 can include the substrate 20; the substrate 20 and a deposited first absorber layer 12 as shown in FIG. 3, with or without a release layer 22; or the substrate 20, with or without the release layer 22, plus any combination of deposited layers, such as reflector 16, first absorber layer 12, second absorber layer 12' and/or one or more SLML layers. The distance from the bottom of the slot die 320 to the substrate 340 is the slot gap G. As can be seen in FIG. 4, the liquid coating composition can be deposited at a wet film thickness D that is greater than a dry film thickness H. After the wet film has been deposited on the substrate 340, any solvent present in the wet film can be evaporated. The liquid coating process continues with curing of the wet film to result in cured, self-leveled SLML 14, 14', 14", and 14'" having the correct optical thickness H (ranging from about 50 to about 700 nm). It is believed that the ability of the SLML 14, 14' to self-level results in a layer having a reduced optical thickness variation across the layer. Ultimately, an article 10 comprising the self-leveled SLML 14, 14', 14", and 14'" can exhibit increased optical precision. For ease of understanding, the terms "wet film" and "dry film" will be used to refer to the composition at various stages of the liquid coating process that results in the SLML 14, 14', 14", and 14'".

The liquid coating process can comprise adjusting at least one of a coating speed and a slot gap G to achieve a wet film with a predetermined thickness D. The SLML 14, 14', 14", and 14'" can be deposited having a wet film thickness D ranging from about 0.1 μm to about 500 μm, for example from about 0.1 μm to about 5 μm. A SLML 14, 14', 14", and 14'" formed with a wet film thickness D in the disclosed range can result in a stable SLML, i.e., without breaks or defects such as ribbing or streaks. In an aspect, the wet film can have a thickness of about 10 μm for a stable wet film using a slot die bead mode with a coating speed up to about 100 m/min. In another aspect, the wet film can have a thickness of about 6-7 μm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 μm. A smaller slot gap can allow for a reduced wet film thickness. In slot-bead mode higher coating speeds can be achieved with a wet film thickness greater than 10 μm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min.

In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example from about 300 m/min to about 1200 m/min.

The wet film can comprise a solvent. As shown in FIG. 4, the solvent can be evaporated from the wet film, such as before the wet film is cured. In an aspect, about 100%, for example about 99.9%, and as a further example about 99.8% of the solvent can be evaporated from the composition of the SLML 14, 14', 14", and 14'", prior to curing of the SLML 14, 14', 14", and 14'". In a further aspect, trace amounts of solvent can be present in a cured/dry SLML 14, 14', 14", and 14'".

In an aspect, a wet film having a greater original weight percent of solvent can result in a dry film having a reduced film thickness H. In particular, a wet film having a high weight percent of solvent and being deposited at a high wet film thickness D can result in a SLML 14, 14', 14", and 14'" having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C., the rheology was measured with an Anton Paar MCR 101 rheometer equipped with a solvent trap using a cone/plate 40 mm diameter with 0.3° angle at a gap setting of 0.025 mm.

In an aspect, the composition of the SLML 14, 14', 14", and 14'" and the solvent can be selected so that the wet film exhibits Newtonian behavior for precision coating of the SLML 14, 14', 14", and 14'" using the liquid coating process. The wet film can exhibit Newtonian behavior shear rates up to 10,000 s$^{-1}$ and higher. In an aspect, the shear rate for the liquid coating process can be 1000 s$^{-1}$ for a coating speed up to 25 m/min, for example 3900 s$^{-1}$ for a coating speed up to 100 m/min, and as a further example 7900 s$^{-1}$ for a coating speed up to 200 m/min. It will be understood that a maximum shear rate can occur on a very thin wet film, such as 1 μm thick. As the wet film thickness is increased, the shear rate can be expected to decrease, for example decrease 15% for a 10 μm wet film, and as a further example decrease 30% for a 20 μm wet film.

The evaporation of the solvent from the wet film can cause a change in viscosity behavior to pseudoplastic, which can be beneficial to achieve a precision SLML 14, 14', 14", and 14'". The dynamic viscosity of the deposited SLML 14, 14', 14", and 14'", after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. In an aspect, the wet film can be cured using ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 200 mJ/cm$^2$ to about 1000 mJ/cm$^2$ for example ranging from about 250 mJ/cm$^2$ to about 900 mJ/cm$^2$, and as a further example from about 300 mJ/cm$^2$ to about 850 mJ/cm$^2$.

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A SLML 14, 14', 14'', and 14''' formed using the liquid coating process can exhibit improved optical performance, i.e., be a precision SLML. A SLML 14, 14', 14'', and 14''' can be understood to mean a SLML having less than about 3% optical thickness variation various across the layer.

In an aspect, there is also disclosed a method of creating a metallic appearance on a substrate, comprising: adding the article disclosed herein to a liquid medium to create a color shifting colorant; and applying the color shifting colorant to at least a portion of the substrate, wherein the color shifting colorant exhibits at least one of high chroma and high flop.

After the color shifting articles, such as flakes, have been sized, they can be blended with other flakes to achieve the color required by adding flakes of different hues, chroma and brightness to achieve a desired result. The color shifting flakes can then be dispersed into a polymeric medium such as a paint, ink, or other polymeric pigment vehicle for use in a conventional manner. At the same time, additives of other types can be mixed with the pigment vehicle to achieve the final desired effects. These additives include lamellar pigments such as aluminum flakes, graphite, carbon aluminum flakes, mica flakes, and the like, as well as non-lamellar pigments such as aluminum powder, carbon black, and other organic and inorganic pigments such as titanium dioxide, and the like. After this has been accomplished, a high chroma durable paint or ink is ready for use.

The color shifting flakes of the invention can also be combined with non-shifting high chroma platelets to produce unique color effects. In addition, the color shifting flakes can be combined with highly reflective platelets such as MgF$_2$/aluminum/MgF$_2$ platelets to produce additional color effects.

By way of example, colors which can be achieved utilizing the interference flakes according to the invention can have color shifts such as gold-to-green, green-to-magenta, blue-to-red, green-to-silver, magenta-to-silver, etc.

The color shifting flakes disclosed can be easily and economically utilized in colorants such as paints and inks for various applications. Colorants which employ the color shifting flakes can be applied to many different objects and papers. Examples of such objects and papers include motorized vehicles, currency and security documents, household appliances, architectural structures, flooring, fabrics, electronic packaging/housing, toys, etc.

Conventional deposition processes for use in the method disclosed herein include, but are not limited to, physical vapor deposition (PVD), sputtering onto a mechanically vibrating bed of particles, decomposition by pyrolysis of metal-organo compounds, and a CVD fluidized bed.

In an example, the SLML includes a alicyclic epoxy resin host using a solvent dye as the SLMM, the reflector includes aluminum.

In an example, the SLML includes a alicyclic epoxy resin host using a Diketopyrrolopyrrole insoluble red dye as the SLMP, the reflector includes aluminum.

In an example, the SLML includes an acrylate oligomer resin host using white pigment (Titania) as the SLMP.

In an example, the SLML includes an acrylate oligomer resin host using black IR transparent pigment as the SLML, the reflector includes aluminum.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A method for forming an article comprising:
   depositing on a substrate a first absorber layer;
   depositing on the first absorber layer a first selective light modulator layer;
   depositing on the first selective light modulator layer a reflector;
   depositing on the reflector a second selective light modulator layer; and
   depositing on the second selective light modulator layer a second absorber layer;
   wherein at least one of the first selective light modulator layer and the second selective light modulator layer is deposited using a liquid coating process;
   wherein each of the first and second selective light modulator layers comprises a solvent and the method further comprises evaporating the solvent from each of the deposited first and second selective light modulator layers before curing each of the deposited first and second selective light modulator layers; and
   wherein the liquid coating process is a process chosen from slot-bead, slide bead, slot curtain, slide curtain and gravure.

2. A method for forming an article comprising:
depositing on a substrate a first absorber layer;
depositing on the first absorber layer a first selective light modulator layer;
depositing on the first selective light modulator layer a reflector;
depositing on the reflector a second selective light modulator layer; and
depositing on the second selective light modulator layer a second absorber layer;
wherein at least one of the first selective light modulator layer and the second selective light modulator layer is deposited using a liquid coating process;
wherein the first and second selective light modulator layer each independently include a selective light modulator particle chosen from a color shifting particle, a reflective pigment, quantum dots, fluorides, or mixtures thereof.

3. The method of claim 1, wherein the liquid coating process comprises curing each one of the deposited first and second selective light modulator layers.

4. The method of claim 2, wherein each of the first and second selective light modulator layers comprises a solvent and the method further comprises evaporating the solvent from each of the deposited first and second selective light modulator layers before curing each of the deposited first and second selective light modulator layers.

5. The method of claim 1, wherein a viscosity for each of the deposited first and second selective light modulator layers ranges from 10 to 3000 cP.

6. The method of claim 1, wherein each of the deposited first and second selective light modulator layers is deposited at a speed ranging from about 0.1 to about 1000 m/min.

7. The method of claim 1, wherein the evaporating of the solvent results in an end first and second selective light modulator layers having a lesser cured film thickness than the thickness of the deposited first and second selective light modulator layers before the evaporating.

8. The method of claim 2, wherein the liquid coating process is a process chosen from slot-bead, slide bead, slot curtain, slide curtain, tensioned web, gravure, and roll coating.

9. A method for forming an article comprising:
depositing on a substrate a first absorber layer;
depositing on the first absorber layer a first selective light modulator layer;
depositing on the first selective light modulator layer a reflector;
depositing on the reflector a second selective light modulator layer; and
depositing on the second selective light modulator layer a second absorber layer;
wherein at least one of the first selective light modulator layer and the second selective light modulator layer is deposited using a liquid coating process;
wherein at least one of the first selective light modulator layer and the second selective light modulator layer includes at least one of (i) a photoinitiator including a phosphineoxide and (ii) an oxygen inhibition mitigation composition including at least one acrylate monomer and at least one acrylate oligomer.

10. The method of claim 1, wherein at least one of the first selective light modulator layer and the second selective light modulator layer has less than about 7% optical thickness variation across the layer.

11. The method of claim 1, further comprising, removing the substrate from the deposited layers.

12. The method of claim 1, wherein the at least one of the first selective light modulator layer and the second selective light modulator layer are deposited having a wet film thickness ranging from about 0.1 μm to about 500 μm.

13. The method of claim 11, further comprising, sizing the article to produce flakes.

14. The method of claim 1, wherein the liquid coating process includes a ratio of slot gap to wet film thickness that ranges from about 1 to about 100 at a coating speed of from about 0.1 to about 1000 m/min.

15. The method of claim 9, wherein the liquid coating process comprises depositing each of the first and second light modulator layers at a rate of from about 0.1 to about 1000 m/min.

16. The method of claim 3, wherein the step of curing uses an ultraviolet light at a dose ranging from about 200 mJ/cm2 to about 1000 mJ/cm2.

* * * * *